No. 609,799. Patented Aug. 30, 1898.
W. T. FLINN.
DEVICE FOR SALTING MEAT.
(Application filed Feb. 25, 1898.)
(No Model.)
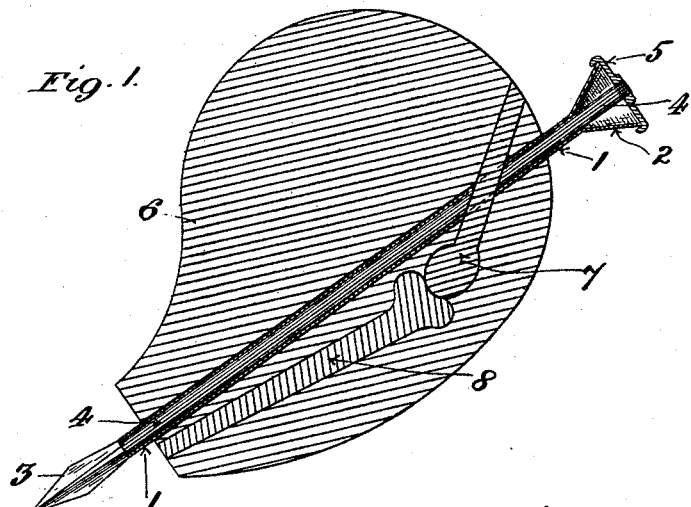
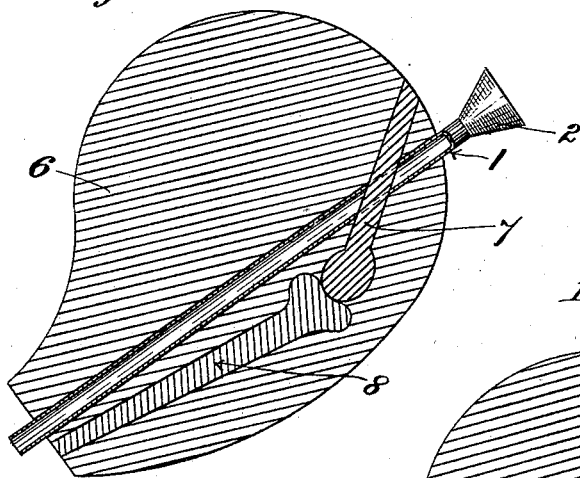
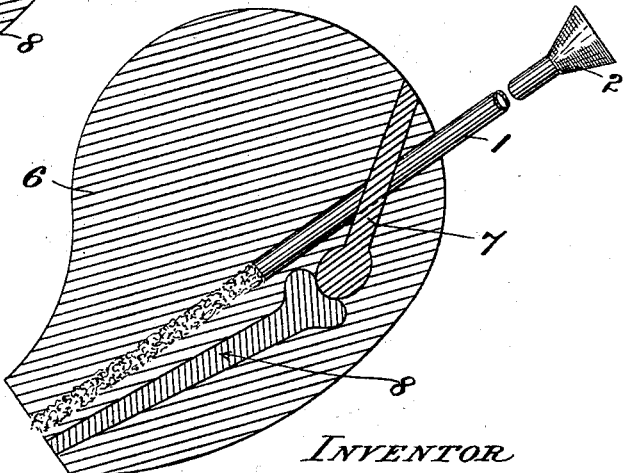
WITNESSES
Edward U. Currell
Lelah W. Carey.
INVENTOR
William T. Flinn
by
Ennis Staver atty

UNITED STATES PATENT OFFICE.

WILLIAM T. FLINN, OF JAMESTOWN, ARKANSAS.

DEVICE FOR SALTING MEAT.

SPECIFICATION forming part of Letters Patent No. 609,799, dated August 30, 1898.

Application filed February 25, 1898. Serial No. 671,611. (No model.)

*To all whom it may concern:*

Be it known that I, WILLIAM T. FLINN, a citizen of the United States, residing at Jamestown, in the county of Independence and State of Arkansas, have invented certain new and useful Improvements in Devices for Salting Meats, of which the following is a full, clear, and exact description, reference being had to the accompanying drawings, forming a part thereof.

My invention has relation to devices for salting meats; and it consists in the novel construction and combination of parts, more fully set forth in the specification and pointed out in the claims.

In the drawings, Figure 1 is a sectional view of a ham with my device inserted thereinto, the latter being shown in longitudinal section. Fig. 2 is a similar view with the spear and its stem withdrawn. Fig. 3 is a similar view with the tube shown in the act of withdrawal from the ham and showing the salt mixture discharging into the meat; and Fig. 4 is a top plan view of the cap-piece, to which the stem of the spear is secured.

The object of my invention is to construct a probing device by means of which a certain quantity of salt mixture or other preservative can be introduced into the tissues of a piece of meat, such as ham and the like, whereby the meat may become thoroughly salted.

In detail the invention may be described as follows:

Referring to the drawings, 1 is a tube or pipe terminating at one end in an enlarged mouth or funnel 2, the opposite end being adapted to be closed by the base of an outwardly-projecting spear 3, the latter being provided with a stem 4, adapted to pass through the tube and being of a length to reach to the open mouth of the funnel. The free end of the stem is screw-threaded, said screw-threaded end being adapted to have secured thereto a cap-piece 5, which when fully screwed down serves to close the open mouth of the funnel, said cap-piece being provided with a circular flange or lip embracing the edge of the funnel, thus making a tight and accurate fit.

In the operation of my device, the parts being coupled together, as indicated and as fully shown in Fig. 1, the spear is forced through the ham 6 (see Fig. 1) adjacent to the loin-bone 7 and close to the middle bone 8 and close to the joint. When the spear has emerged from the ham, the cap-piece is unscrewed and the spear is withdrawn from the tube in the same direction in which it was inserted into the meat. The operator then, while he closes the lower end of the tube with the finger of his left hand, introduces into the tube through the funnel an amount of salt or preserving mixture sufficient to fill the tube. The latter is then withdrawn from the ham in the opposite direction from which it was introduced—that is to say, it is retracted—and as it is being withdrawn the operator keeps rocking it back and forth, thus permitting the salt to drop out of the tube into the opening left by the probe, the salt being dissolved in time by the moist tissues of the meat. After the tube is fully withdrawn any salt remaining in the same can be discharged onto a piece of paper or a suitable receptacle for its reception for future use. Figs. 2 and 3 illustrate the steps already referred to. The parts can be subsequently assembled and the same operation repeated on the opposite side of the bones.

The mixture introduced into the tube is composed generally of ten parts by weight of saltpeter, one hundred and twenty parts of salt, and twenty parts of boric acid. The ingredients are mixed dry and in a thoroughly-pulverized condition.

The treatment here described of course is supplemental to the common salting process to which the outside of the ham is subjected.

It is to be understood that I do not limit myself to the material of which the device is constructed; but preferably the instrument is made of steel nickel-plated, the spear-point being of good steel and with a keen edge.

Having described my invention, what I claim is—

1. A meat-salting device comprising a tube, a spear adapted to close and bear against one end thereof, a flaring mouth formed at the opposite end of the tube, a stem carried by the spear and passing through the tube, the spear and stem being adapted to be inserted and withdrawn from the end of the tube which is opposite to the mouth thereof, and means for securing the stem and spear carried by it from the end of the tube carrying the mouth, substantially as set forth.

2. A meat-salting device comprising a salt-holding tube, a spear, adapted to close one end of the tube, a stem carried by the spear and adapted to be inserted into the tube, a funnel or flaring mouth formed at the opposite end of the tube, a cap having a circular lip or flange adapted to embrace the edge of the funnel, a screw-thread being formed on the stem at the free end thereof, the cap being adapted to be screwed to said screw-threaded end of the stem, the parts operating substantially as and for the purpose set forth.

In testimony whereof I affix my signature in presence of two witnesses.

WILLIAM T. FLINN.

Witnesses:
H. N. DICKSON,
JNO. CRAIG.